(12) United States Patent
Takano et al.

(10) Patent No.: US 7,091,900 B2
(45) Date of Patent: Aug. 15, 2006

(54) RADAR

(75) Inventors: Kazuaki Takano, Mito (JP); Hiroshi Kuroda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/502,596

(22) PCT Filed: Jan. 28, 2002

(86) PCT No.: PCT/JP02/00590

§ 371 (c)(1),
(2), (4) Date: Jul. 27, 2004

(87) PCT Pub. No.: WO03/065072

PCT Pub. Date: Aug. 7, 2003

(65) Prior Publication Data

US 2005/0083227 A1 Apr. 21, 2005

(51) Int. Cl.
*G01S 13/93* (2006.01)
(52) U.S. Cl. .............................. 342/70; 342/75; 342/80
(58) Field of Classification Search ................... 342/70, 342/78, 80, 149, 74, 75
See application file for complete search history.

(56) References Cited

U.S. PATENT DOCUMENTS 3,781,886 A * 12/1973 Lank et al. ................... 342/78
3,886,555 A * 5/1975 Royal .......................... 342/78
5,926,127 A * 7/1999 Schmidt et al. ............... 342/70
6,119,067 A * 9/2000 Kikuchi ....................... 342/70

FOREIGN PATENT DOCUMENTS

| EP | 0443643 A | 8/1991 |
| EP | 773598 A2 | 5/1997 |
| EP | 920068 A2 | 6/1999 |
| JP | 11-118926 A | 4/1999 |
| JP | 2000-258527 A | 9/2000 |

OTHER PUBLICATIONS

Keiji Fujimura, "Development Trend of Vehicle Millimeter Wave Radars", Journal of The Institute of Electronics, Information and Communication Engineers, Oct. 1996, pp. 977-981.

* cited by examiner

*Primary Examiner*—Ian J. Lobo
(74) *Attorney, Agent, or Firm*—Crowell & Moring LLP

(57) ABSTRACT

A radar of the present invention has: (1) an antenna unit for transmitting a radio wave and receiving a reflected wave of the radio wave; (2)
rotating means for rotating the antenna unit about an axis along a direction of transmitting the radio wave; and (3) control means for detecting an azimuth of a target from the reflected wave, the azimuth using the axis as a reference and being defined in a plane determined from a posture of the antenna unit and the axis.

18 Claims, 12 Drawing Sheets

RADAR

TECHNICAL FIELD

The present invention relates to a radar for detecting the presence or the like of a target by transmitting a radio wave and receiving its reflected wave.

BACKGROUND ART

Some radars mounted on vehicles can detect the azimuth angle of a target existing on a road (a deviation angle between a directional line from the radar to the target: hereinafter called a target azimuth angle). For example, "Development Trend of Vehicle Millimeter Wave Radars", Journal of The Institute of Electronics, Information and Communication Engineers, Vol. 1996, October (pp. 977–pp. 981) describes: (1) a mechanical scan type radar which realizes horizontal scanning of a main beam of a transceiver antenna by mechanically swinging the transceiver antenna; (2) a beam switching type radar which realizes horizontal scanning of a main beam by sequentially switching between transceivers for transmitting beams having different directions; and (3) a monopulse type radar which detects a target azimuth angle in the horizontal plane from a phase difference of reception waves received by two antennas disposed right and left. The radars mounted on vehicles enumerated herein all have as their main object detecting a target on a road, so that only the target azimuth angle in the horizontal plane is detected.

DISCLOSURE OF THE INVENTION

An object of the present invention is to provide a radar capable of detecting a target azimuth angle in an arbitrary plane including a reference axis. In order to achieve this object, a radar of this invention comprises: (1) an antenna unit for transmitting a radio wave and receiving a reflected wave of the radio wave; (2)

rotating means for rotating the antenna unit about an axis along a direction of transmitting the radio wave; and (3) control means for detecting an azimuth of a target from the reflected wave, the azimuth using the axis as a reference and being defined in a plane determined from a posture of the antenna unit and the axis.

Specific constituent elements described in the best mode for carrying out the invention are intended to have the degree of freedom of as many combinations as possible and each of the combinations constitutes the present invention. For example, a mode properly deleting some of the structure of the best mode for carrying out the invention also constitutes an embodiment of the invention.

BEST MODE FOR CARRYING OUT THE INVENTION

With reference to the accompanying drawings, description will be made in the following on the best mode for carrying out the invention.

First, description will be made on the structure of a two-frequency CW radar of a monopulse type according to a preferred embodiment of the present invention. Although a radar of a homodyne detection type is used herein as an example, the invention is also applicable to a radar of a heterodyne detection type.

Figure 1:
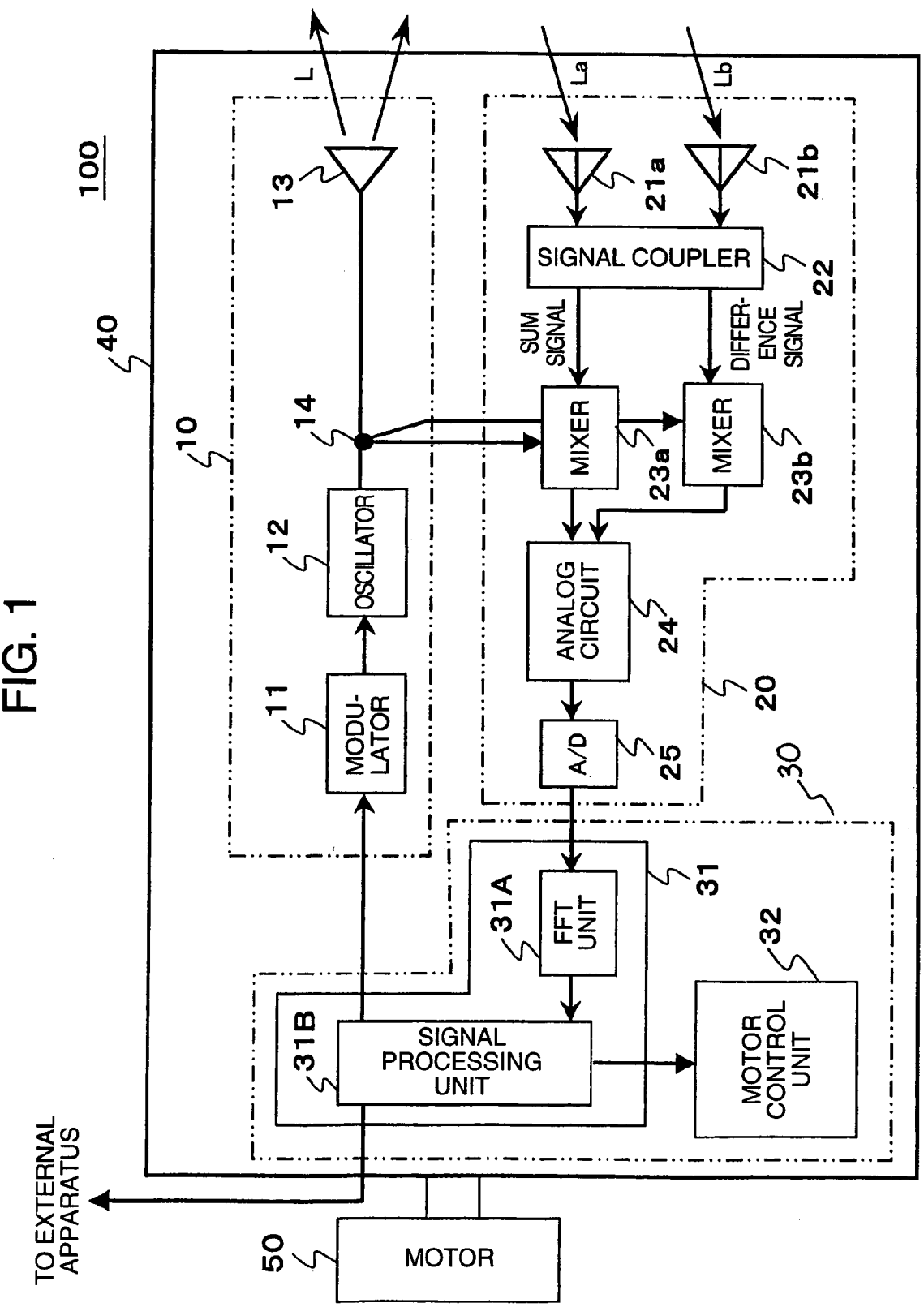
FIG. 1 is a block diagram showing the structure of a radar according to an embodiment of the present invention.

As shown in FIG. 1, a radar 100 according to the preferred embodiment of the present invention has: a wave transmission unit 10 radiating a radio wave L toward an external; a wave reception unit 20 for receiving echoes La and Lb from targets (not shown) existing in the external; a control unit 30 for controlling the whole of the radar 100; a frame 40 accommodating these units 10, 20 and 30; a motor 50 for rotating the frame 40 about the central axis of the radio wave L (a boresight $L_0$ in FIGS. 3 and 8), and other components. The central axis $L_0$ of the radio wave L is hereinafter used as the reference axis of the target azimuth.

Figure 2:
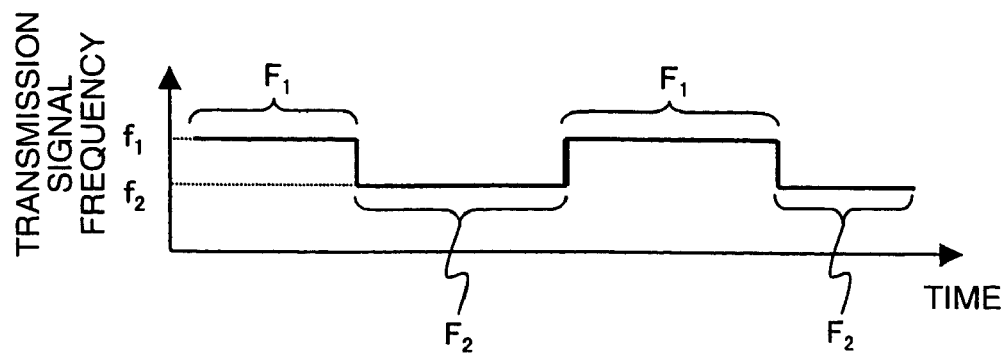
FIG. 2 is a diagram showing a change in the frequency of a transmission signal from a two-frequency CW radar.

The wave transmission unit 10 has: a modulator 11 for alternately outputting two types of modulated signals in response to a switching command from the control unit 30; an oscillator 12 for outputting a high frequency signal (e.g., a radio wave signal in a millimeter wave band) having an oscillation frequency corresponding to the modulated signal from the modulator 11; a transmission antenna element 13 for transmitting an output from the oscillator 12 as the radio wave L; a directional coupler 14 for guiding a portion of an output of the oscillator 12 to the wave reception unit 20 as the reference signal for frequency conversion, and other components. With this arrangement, two continuous waves $F_1$ (oscillation frequency $f_1$) and $F_2$ (oscillation frequency $f_2$) having different oscillation frequencies such as shown in FIG. 2 are alternately radiated from the transmission antenna element 13 of the wave transmission unit 10.

The wave reception unit 20 has: two reception antenna elements 21a and 21b juxtaposed with the transmission antenna element 13 in the state being directed along the radiation direction of the radio wave L; a signal coupler (hybrid circuit or the like) 22 for acquiring a sum signal and a different signal of outputs from the two reception antenna elements 21a and 21b, respectively for each of the oscillation frequencies $f_1$ and $f_2$; a first mixer 23a for mixing the sum signal from the signal coupler 22 and the signal from the directional coupler 14 to generate a beat signal, respectively for each of the oscillation frequencies $f_1$ and $f_2$; a second mixer 23b for mixing the difference signal from the signal coupler 22 and the signal from the directional coupler 14 to generate a beat signal (doppler signal), respectively for each of the oscillation frequencies $f_1$ and $f_2$; an analog circuit 24 for demodulating and amplifying the beat signals (doppler signals) from the mixers 23a and 23b, respectively for each of the oscillation signals $f_1$ and $f_2$, an A/D converter 25 for sampling an analog signal output from the analog circuit 24 at predetermined sampling intervals T [sec], separately for each of the oscillation frequencies $f_1$ and $f_2$, and other components. With this arrangement, the wave reception unit 20 receives echoes from the targets at different positions, and detects the echoes La and Lb received at the different positions, separately for each of the oscillation frequencies $f_1$ and $f_2$. The sampled signals of the doppler signals generated from the sun and difference signals as the detection results are input to the next control unit 30, separately for each of the oscillation frequencies $f_1$ and $f_2$.

The control unit 30 has: a motor control circuit 32 for controlling the rotation angle of the motor 50; a microcomputer 31 for analyzing the detection results of the wave reception unit 20 to generate a command to be supplied to the motor control circuit 32 or an external apparatus (an alarm apparatus or the like); and other components. The microcomputer 31 realizes an FFT (FFT: Fast Fourier Transform) unit 31A and a signal processing unit 31B by executing software. The FFT unit 31A detects, from the detection results of the wave reception unit 20, information necessary for calculating target information (a distance between the radar and each target, a relative velocity of the radar 100 and each target, and a target azimuth angle in the plane including the centers of the two reception antenna elements 21a and 21b and the reference axis). The signal processing unit 31B instructs a switching timing of the two oscillation frequencies $f_1$ and $f_2$ to the modulator 11 and analog circuit 24 and supplies a control command corresponding to the detection results by the FFT unit 31A to the motor control circuit 32 or external apparatus.

Figure 14:
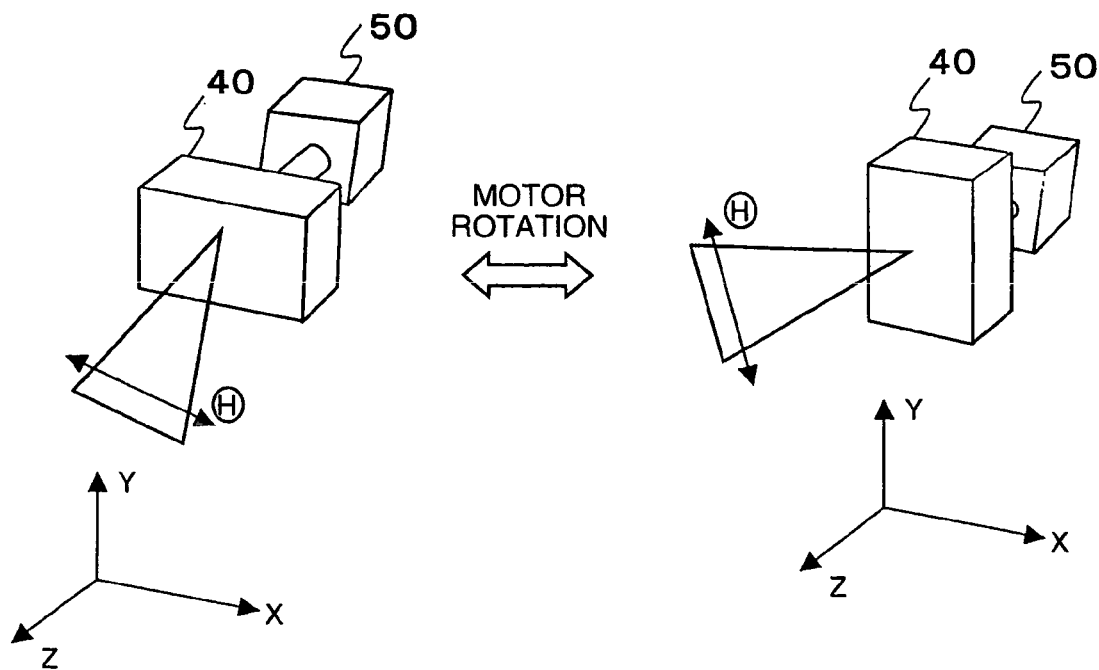
FIG. 14 is a conceptual diagram illustrating a method of switching the azimuth direction of the radar in the cover area according to the embodiment of the present invention.

With this arrangement, as shown in FIG. 14, since the frame 40 accommodating therein a serial array of the antenna elements 13, 21a and 21b can be rotated by the motor 50, the array direction of the antenna elements 13, 21a and 21b can be changed from an X-direction to a Y-direction and from the Y-direction to the X-direction, for example, in accordance with the state and the like of the radar 100 in its cover area. Namely, even the radar 100 of the monopulse type for detecting essentially only the target azimuth in the horizontal plane (XZ plane) can change the azimuth direction Θ in its angle cover area from the X-direction to the Y-direction and from the Y-direction to the X-direction. It is therefore possible to detect not only the target azimuth angle in the horizontal plane (XZ plane) but also the target azimuth angle in the vertical plane (YZ plane). If the signal processing unit 31B is made to control the rotation angle of the motor 50 more finely, the array of the antenna elements 13, 21a and 21b can be made to acquire an arbitrary posture in the YX plane, so that it is possible to detect the target azimuth angle in an arbitrary plane including the reference axis.

In this embodiment, although the shaft of the motor 50 is fixed to the frame 40 accommodating therein the control unit 30, wave transmission unit 10 and wave reception unit 20, this configuration is not necessarily required if rotation of the shaft of the motor 50 can be transmitted to the frame 40. For example, rotation of the shaft of the motor 50 may be transmitted to the frame 40 via a transmission belt or the like. A mechanism different from the motor may be used if the frame 40 is provided with a rotation motion about the reference axis. For example, the frame held by a rotary shaft may be swung by a magnet or the like.

Figure 15:
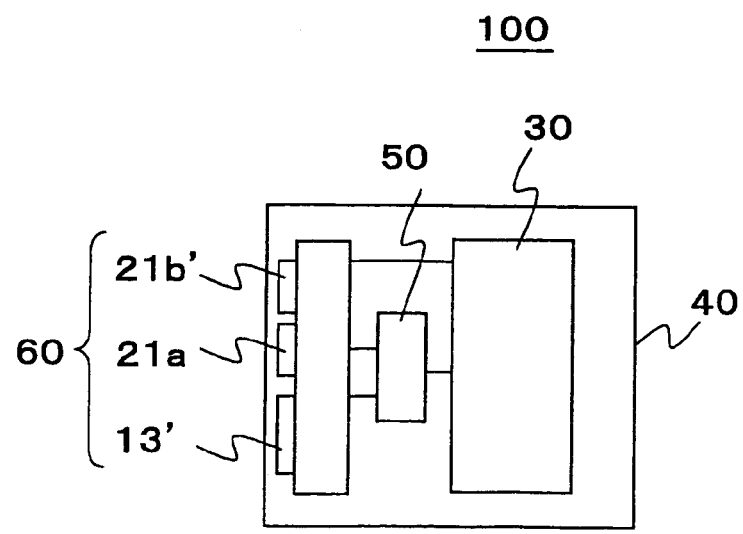
FIG. 15 is a diagram showing the layout of the inside of the frame of the radar according to the embodiment of the present invention.

Further, in this embodiment, although the frame 40 accommodating therein the control unit 30, wave transmission unit 10 and wave reception unit 20 is rotated as a whole, this configuration is not necessarily required. For example, as shown in FIG. 15, the shaft of the motor 50 may be fixed to an antenna array 60 having an antenna element 13' functioning as the transmission antenna element 13 of the wave transmission unit 20 and antenna elements 21a' and 21b' functioning as the two antenna elements 21 of the wave reception unit 20 to rotate only the antenna array 60. In this case, the motor 50 can also be accommodated in the frame 40.

Figure 3:
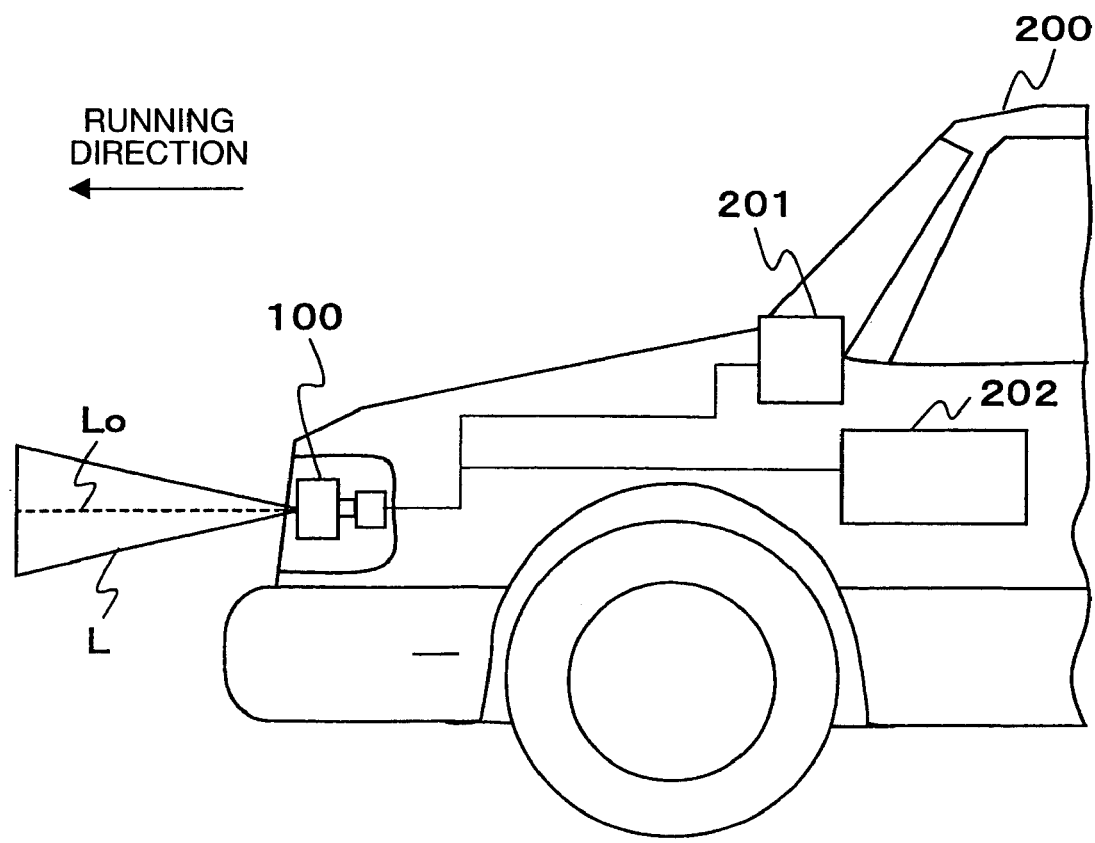
FIG. 3 is a broken diagram of a vehicle mounted with the radar according to the embodiment of the present invention.

Next, description will be made on the processes to be executed by the microcomputer 31, i.e., the processes to be executed by the above-described functional structures 31A and 31B realized by software. However, as shown in FIG. 3, the description will be made by taking as an example the case wherein the radar 100 is mounted on the front of a vehicle 200 in such a manner that the running direction of the vehicle 200 is generally parallel to the reference axis $L_0$, and an ACC (Adaptive Cruise Control) system 202 and an alarm apparatus 201 of the vehicle are connected to the radar 100 as the above-described external apparatus.

Figure 4:
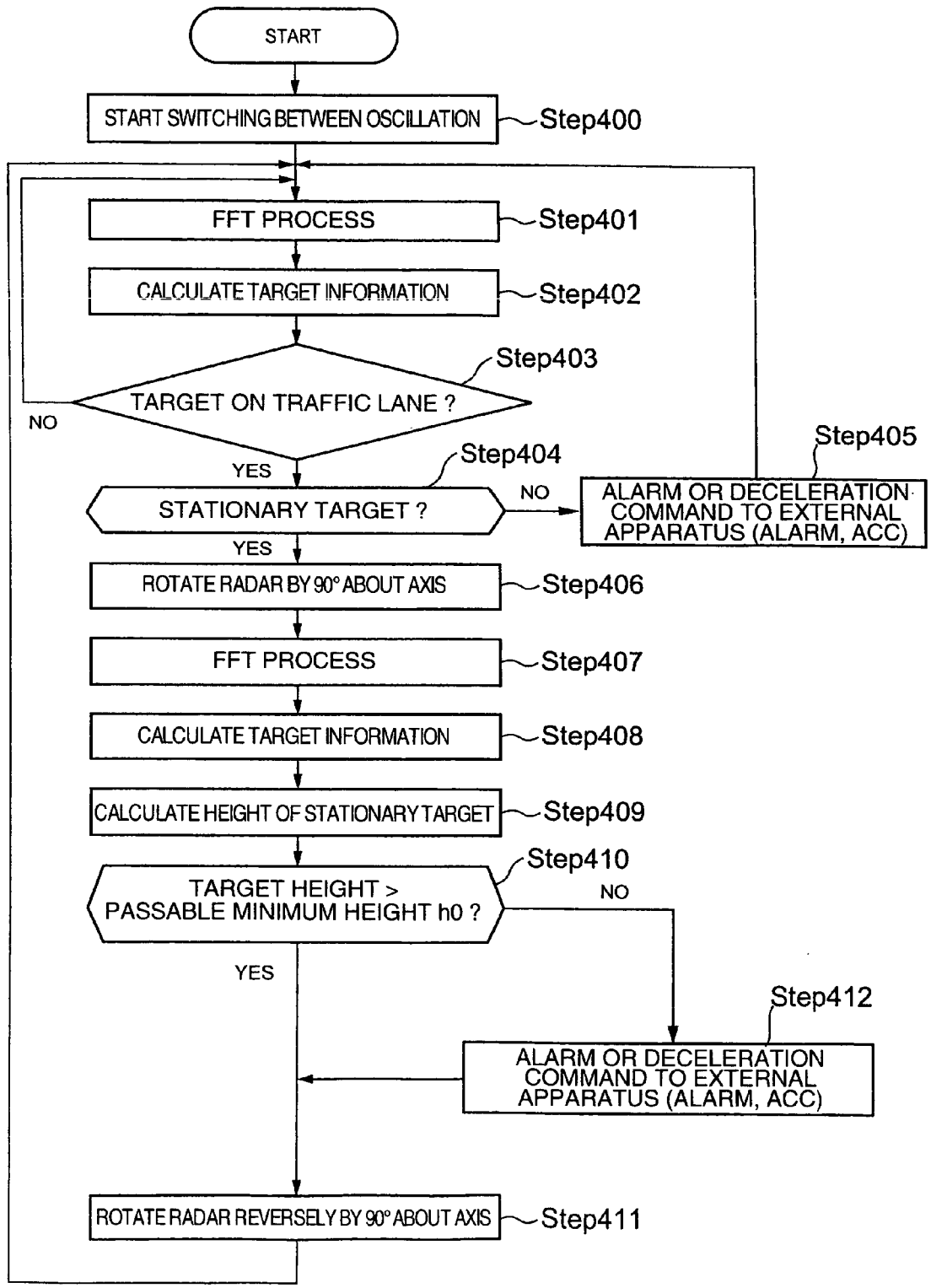
FIG. 4 is a flow chart illustrating a process to be executed by a microcomputer according to the embodiment of the present invention.

FIG. 4 is a flow chart illustrating the processes to be executed by the microcomputer 31 of the radar 100.

Figure 5:
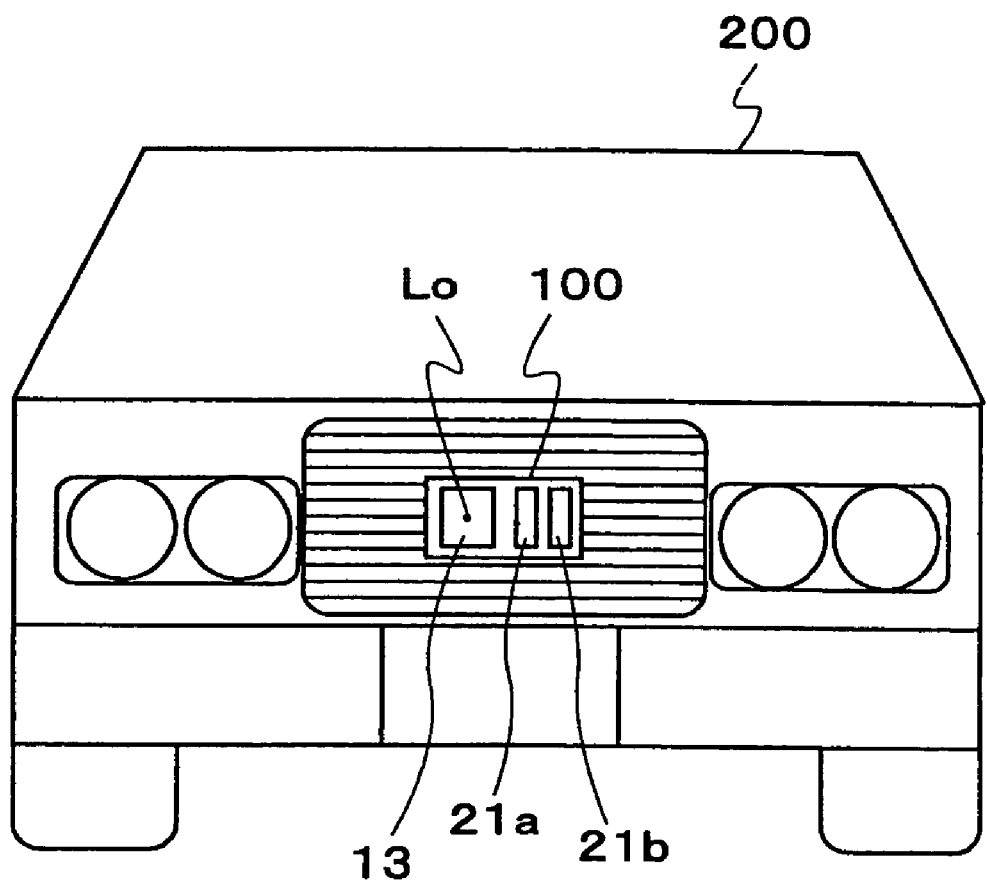
FIG. 5 is a front view of the vehicle mounted with the radar according to the embodiment of the present invention.

First, as shown in FIG. 5, under the conditions that the three antenna elements 13, 21a and 21b are disposed in line generally in the horizontal direction, the signal processing unit 31B starts instructing a switching timing of two oscillation frequencies $f_1$ and $f_2$ (Step 400). Therefore, the switching timings of the two oscillation frequencies $f_1$ and $f_2$ are alternately and periodically supplied to the modulator 11 of the wave transmission unit 10 and the analog circuit 24 of the wave reception unit 20. Therefore, the wave transmission unit 10 oscillates thereafter alternately and periodically the continuous waves $F_1$ and $F_2$ having the oscillation frequencies $f_1$ and $f_2$, whereas the wave reception unit 20 can detect an echo from each target, respectively for each of the oscillation frequencies $f_1$ and $f_2$, on the assumption that each target exists in the radiation area of the radio wave L.

Figure 6:
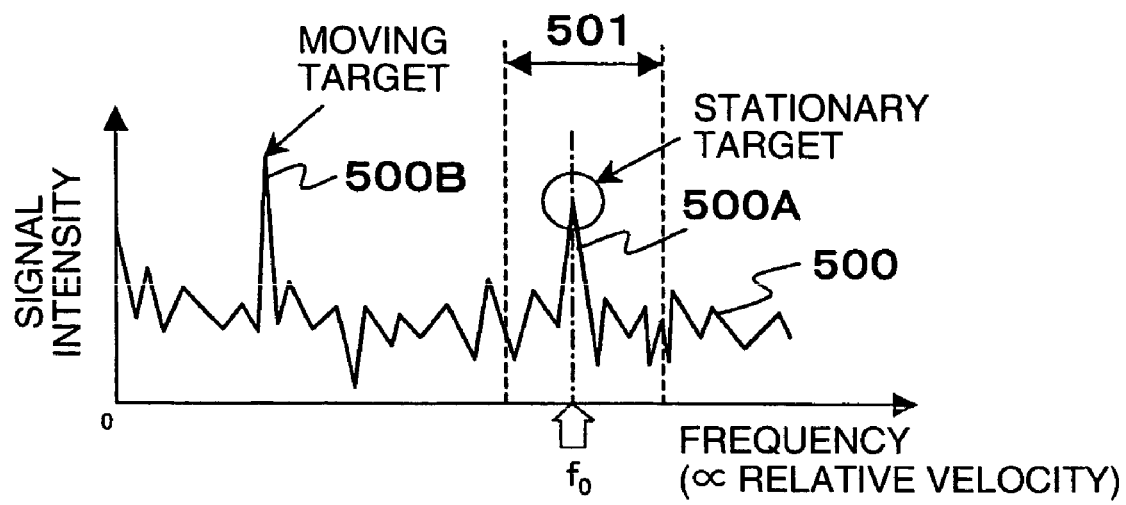
FIG. 6 is a diagram showing a frequency spectrum generated by an FFT unit.

As the wave reception unit 20 starts detecting an echo from each target, the FFT unit 31A dissolves the sampled signals supplied from the reception unit 20 into frequency components through fast Fourier transform (FFT: Fast Fourier Transform), respectively for each of the oscillation frequencies. Therefore, as shown in FIG. 6, a frequency spectrum 500 having peak signals corresponding to the targets (as an example of this case, two peak signals 500A and 500B) can be obtained for each oscillation frequency and for each of the doppler signals obtained from the sum signal and difference signal of the reception signals by the two reception antenna elements 21a and 21b. The FFT unit 31A detects the peak signals of each frequency spectrum through a threshold value process, and outputs the frequency and phase of each peak signal to the signal processing unit 31B (Step 401). The phase of the peak signal of each frequency spectrum is given as an angle between the peak and the real value axis of each frequency spectrum represented by a complex number.

Thereafter, in accordance with the outputs from the FFT unit 31A, the signal processing unit 31B calculates, as shown in the following, the target information of each target (a distance to the target from the radar 100, a relative velocity of the radar 100 and target, a target azimuth angle in the horizontal plane) (Step 402).

Figure 7:
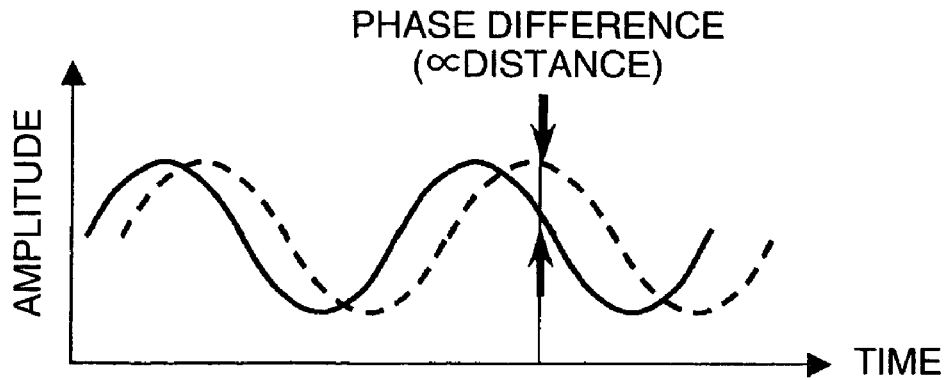
FIG. 7 shows waveforms of doppler signals generated by a mixer.

The doppler signals generated from the sum signal or difference signal of the reception signals by the two reception antenna elements 21a and 21b, respectively for each of the oscillation frequencies $f_1$ and $f_2$ have a phase difference proportional to the distance between the radar 100 and target, as shown in FIG. 7, and the doppler frequency of the doppler signals is proportional to the relative velocity of the radar 100 and target. It is therefore assumed herein that the signal processing unit 31B calculates the distance D to the target and the relative velocity V of the target in accordance with the frequency and phase of the peak signal in the frequency spectra of two doppler signals obtained from the sum signal for each of the two oscillation frequencies. Specifically, the following two equations (1) and (2) are used.

$$D = c \cdot \Delta\phi / \{4 \cdot \pi \cdot \Delta f\} \quad (1)$$

$$V = c \cdot fd / (2 \cdot fc) \quad (2)$$

where: c is a light velocity; $\Delta\phi$ is a phase difference $\phi_1 - \phi_2$) between the peak signals $\phi_1$ and $\phi_2$ of the frequency spectrum of each doppler signal obtained from the sum signal of the reception signals by the two reception antenna elements 21a and 21b for each of the two oscillation frequencies $f_1$ and $f_2$; $\Delta f$ is a difference ($f_1 - f_2$) between the two oscillation frequencies $f_1$ and $f_2$, fd is an average ($fd_1 + fd_2$)/2 of the frequencies (doppler frequencies) $fd_1$ and $fd_2$ of the peak signals of each frequency spectrum obtained from the sum signal of the reception signals by the two reception antenna elements 21a and 21b for each of the two oscillation frequencies $f_1$ and $f_2$; and fc is an average ($f_1 + f_2$)/2 of the oscillation frequencies $f_1$ and $f_2$ (the same is applicable in the following).

Figure 8:
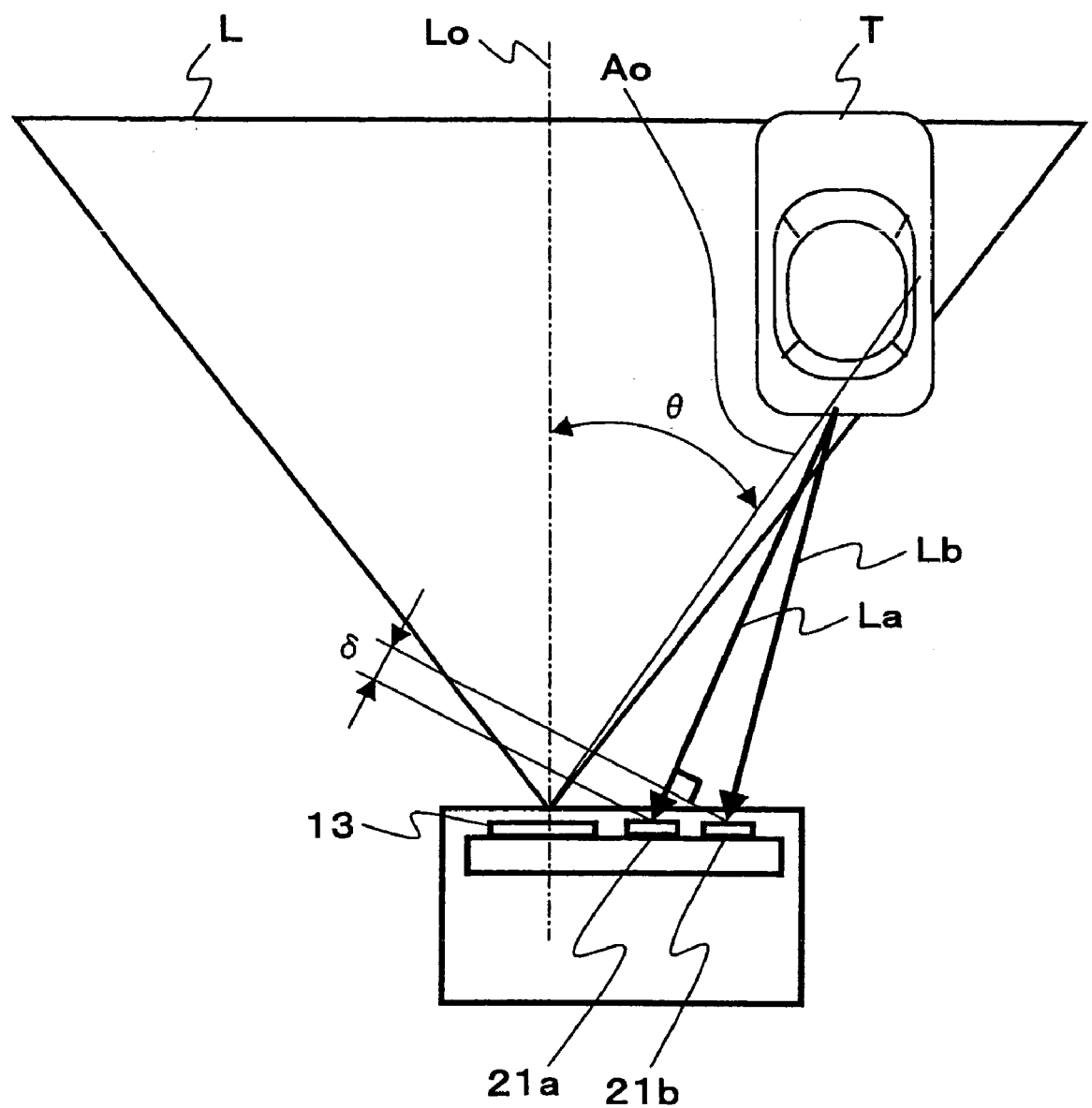
FIG. 8 is a diagram illustrating a target azimuth detecting principle of the radar according to the embodiment of the present invention.

As shown in FIG. 8, if the azimuth angle of the target is not 0, the echoes La and Lb received by the two reception antenna elements 21a and 21b have a phase difference due to a difference δ between propagation distances. Therefore, an amplitude ratio (difference signal/sum signal) of the difference signal to the sum signal of the reception signals by the two reception antenna elements 21a and 21b is a target azimuth angle in the plane including the centers of the two reception antenna elements 21, 21 and the reference axis $L_0$, i.e., a value representative of the target azimuth angle θ in the horizontal plane. Therefore, the signal processing unit 31B calculates, as the target azimuth angle θ in the horizontal plane, the amplitude ratio (difference signal/sum signal) of peaks of the frequency spectra obtained from the beat signal of the sum signal corresponding to one frequency $f_1$ and the beat signal of the difference signal corresponding to the same frequency $f_1$, among the outputs from the FFT unit 31A.

Figure 9:
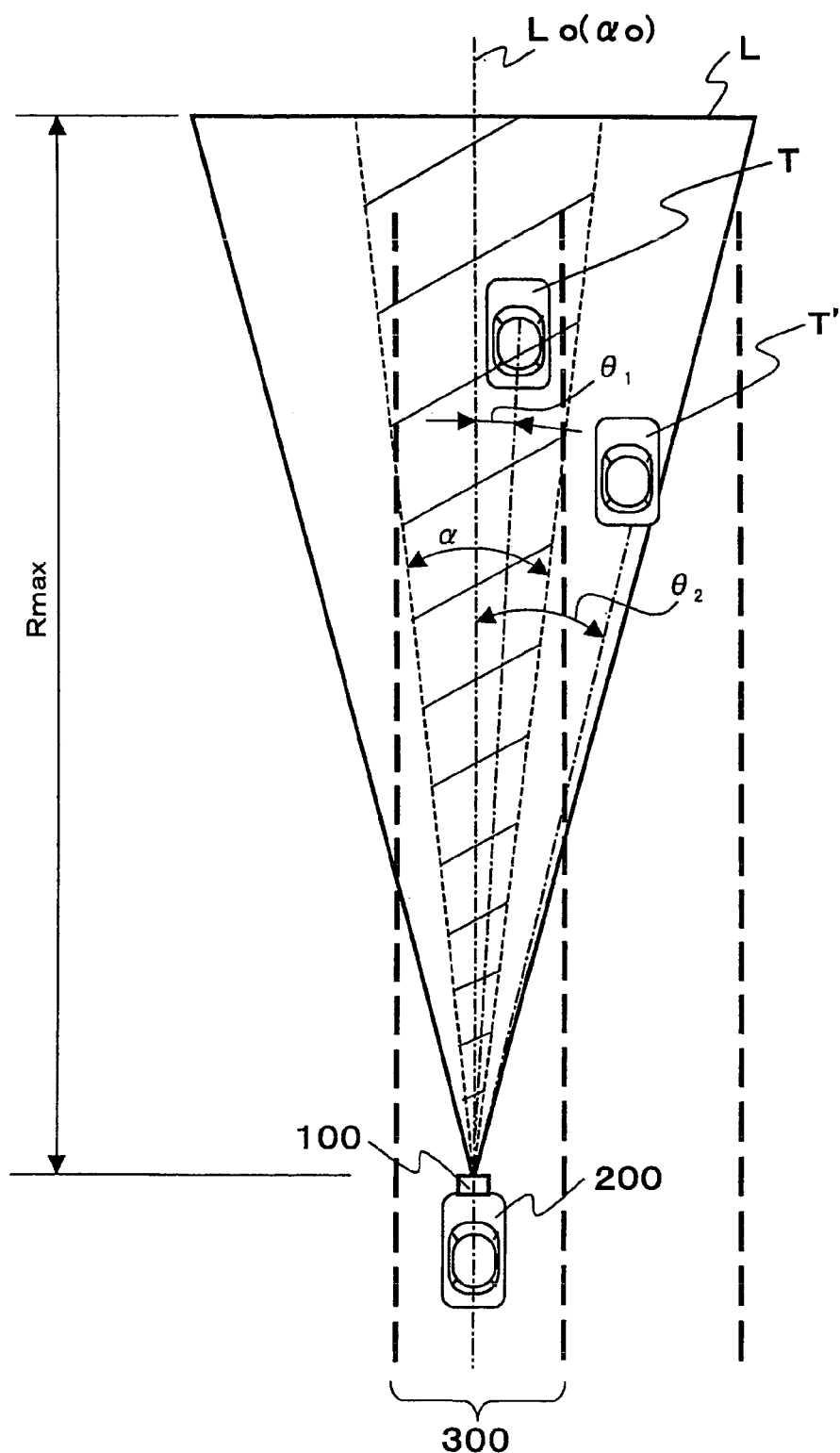
FIG. 9 is a conceptual diagram showing a total search range and a local search range of the radar according to the embodiment of the present invention.
Figure 10:
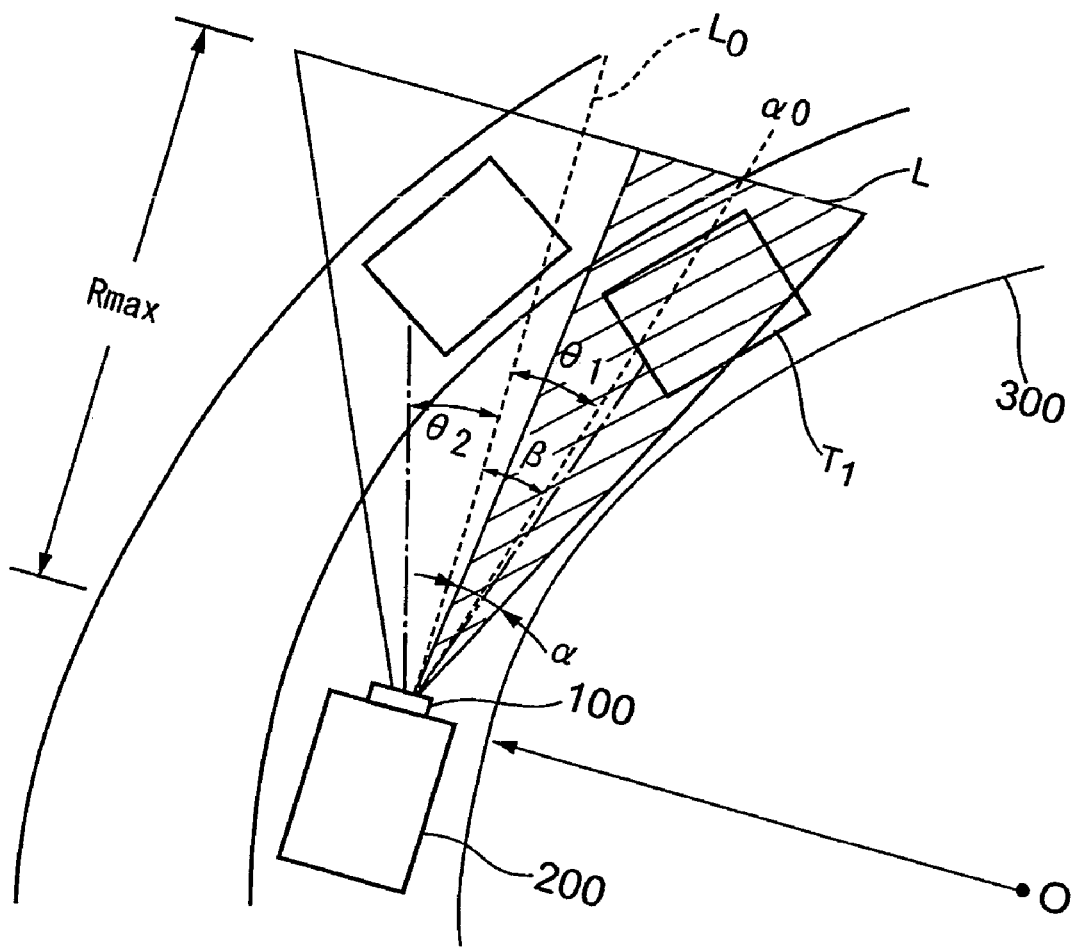
FIG. 10 is a conceptual diagram showing the total search range and a local search range of the radar according to the embodiment of the present invention.

After the information of each target is acquired in the above manner, the signal processing unit 31B estimates the radius R of curvature of a traffic lane of the vehicle 200 from the outputs of an angular velocity sensor and a vehicle velocity sensor mounted on the vehicle 200. Specifically, the radius R of curvature of the traffic lane of the vehicle is calculated by inputting an angular velocity ω and a vehicle velocity v of the vehicle 200 and using a function of 1/R=f(ω, v) outputting the radius R of curvature of the traffic lane of the vehicle 200. In accordance with the calculated radius R of curvature, the signal processing unit 31B defines a range which is supposed to be the area on the traffic lane 300 of the vehicle 200 in the horizontal plane, and judges whether this range contains the direction of the target azimuth angle contained in the target information of each target. Namely, the signal processing unit 31B judges whether each target exists on the traffic lane 300 of the vehicle 200 (Step 403). For example, as shown in FIG. 9, if the traffic lane 300 of the vehicle 200 is generally straight, a local search range α having a predetermined width (e.g., about the width of the lane) at the longest search distance Rmax is defined so that the reference axis $L_0$ of the radar 100 becomes coincident with the center axis $α_0$, and it is judged whether this local search range α contains the target azimuth angles $θ_1$ and $θ_2$ of the targets $T_1$ and $T_2$. Therefore, in the traffic conditions shown in FIG. 9, one target $T_1$ is judged that it exists on the traffic lane 300 of the vehicle 200, whereas the other target $T_2$ does not exist on the traffic lane 300 of the vehicle 200. Further, as shown in FIG. 10, if the traffic lane 300 of the vehicle 200 is curved, the center axis $α_0$ of the local search range α defined when the traffic lane is generally straight is rotated by an angle β corresponding to the radius R of curvature of the traffic lane 300 (e.g., an angle given by a product of the radius R of curvature and an appropriate constant) toward the center O of the radius of curvature of the traffic lane 300, and it is judged whether this local search range α after rotation contains the target azimuth angles $θ_1$ and $θ_2$ of the targets $T_1$ and $T_2$. Therefore, in the traffic conditions shown in FIG. 10, one target $T_1$ is judged that it exists on the traffic lane 300 of the vehicle 200, whereas the other target $T_2$ does not exist on the traffic lane 300 of the vehicle 200.

If the judgement process (Step 403) of this kind shows that the target does not exist on the traffic lane 300 of the vehicle 200, the microcomputer 31 returns to the process at S401. Conversely, if it is judged that one or more targets exist on the traffic lane 300 of the vehicle 200, as shown in FIG. 6 the signal processing unit 31B determines a frequency band 501 having a predetermined width including a reference frequency signal $f_0$ (=2·fc·v/c) generated through frequency conversion of the vehicle velocity v supplied from the vehicle velocity sensor, (the predetermined width being, for example, a width of about 3% to 20% of the reference frequency $f_0$ on both sides of the reference frequency), and judges whether a peak signal exists in the frequency band 501 (Step 404). The peak 500A contained in the determined frequency band 501 is generated by the echo from a standstill target (hereinafter called the stationary target), and the peak contained in the other frequency band is generated by the echo from a moving target (hereinafter called the moving target). Therefore, the process (at Step 404) judges whether the stationary target exists on the traffic lane of the vehicles 200.

If it is judged that a stationary target does not exist on the traffic lane of the vehicle 200, i.e., if it is judged only a moving target exists on the traffic lane of the vehicle 200, the signal processing unit 31B supplies the alarm apparatus with a command for instructing to output a message containing the target information of each target, and supplies the target information of each target to the ACC system as a feedback signal (Step 405). In this manner, the alarm apparatus outputs the message containing the target information of the moving target, whereas the ACC system controls the drive system of the vehicle 200 so as to maintain some distance to the moving target.

On the other hand, if it is judged that a stationary target exists on the traffic lane of the vehicle 200, the microcomputer 31 executes the following process.

Figure 11:
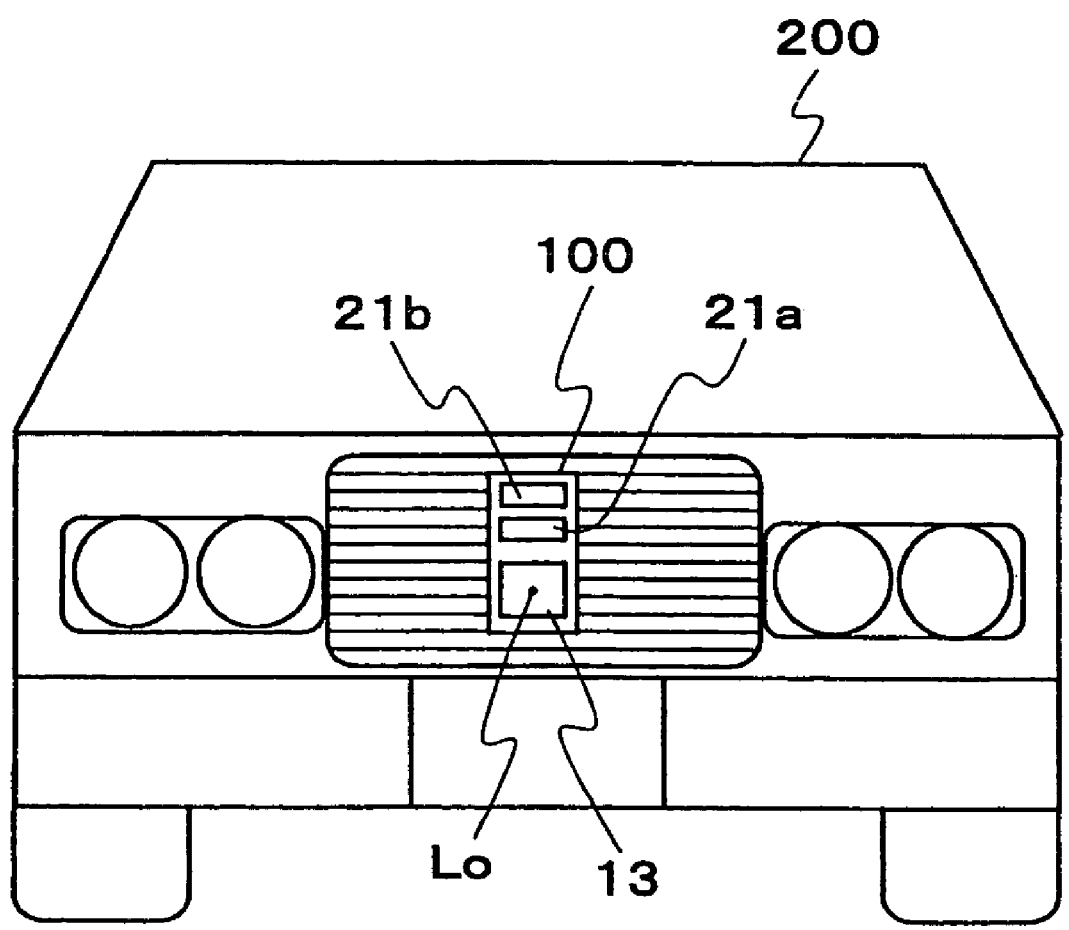
FIG. 11 is a front view of a vehicle mounted with a radar according to an embodiment of the present invention.

First, the signal processing unit 31B supplies the motor control circuit 32 with a control command containing a rotation angle of "+90 degrees" of the motor 50. In response to this, as shown in FIG. 11, the motor control circuit 32 rotates the shaft of the motor 50 by +90 degrees to rotate the frame 40 by +90 degrees about the reference axis $L_0$. The three antenna elements 13, 21a and 21b are therefore disposed in line generally along the vertical direction (Step 406).

Figure 12:
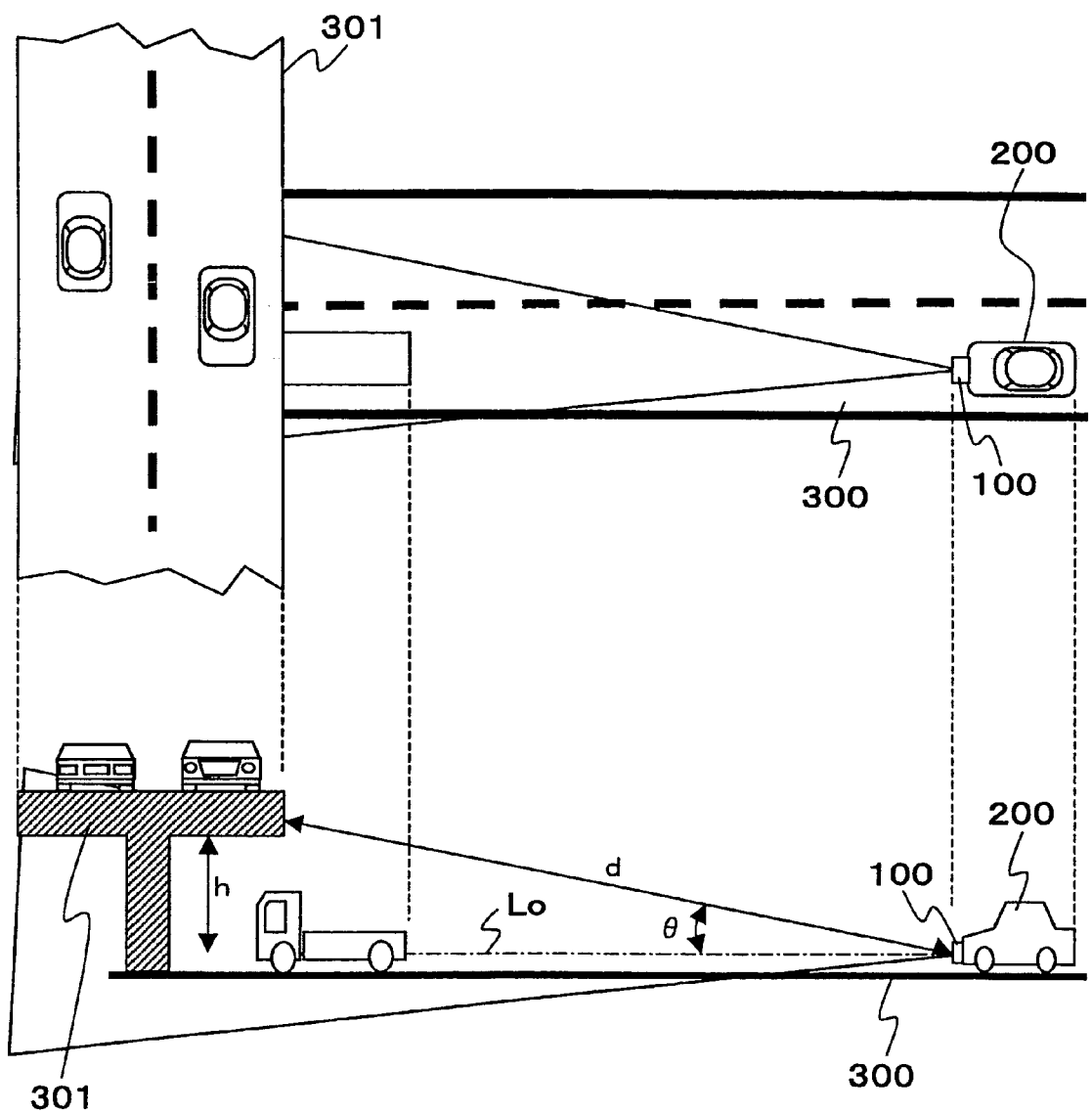
FIG. 12 is a diagram showing the positional relation between the radar and a stationary target in the local search range according to the embodiment of the present invention.

Under this condition, the FFT unit 31A dissolves a new sampled signal from the wave reception unit 10 into frequency components and outputs the information necessary for calculating the target information of each target to the signal processing unit 31B, by the process similar to that at Step 401 (Step 407). The signal processing unit 31B further detects a stationary target from an output of the FFT unit 31A, by the process similar to that at Step 404, and calculates the target azimuth angle in the vertical plane and the distance from the radar 100 respectively of the stationary target, by the process similar to that at Step 402 (Step 408). In accordance with the calculation results, the signal processing unit 31B calculates a height of the stationary target relative to the reference axis $L_0$. Specifically, it calculates a product of the distance from the radar 100 to the stationary target and a sine value of the target azimuth angle in the vertical plane. For example, as shown in FIG. 12, if a high level road 301 three-dimensionally crossing the traffic lane 300 of the vehicle 200 is detected as the stationary target on the traffic lane 300 of the vehicle 200, the height h of the high level load 301 relative to the reference axis $L_0$ is calculated as a product $D \cdot \sin \theta$ of the distance D from the high level road 301 to the radar 100 and the sine value $\sin \theta$ of the target azimuth $\theta$ of the high level road 301 (Step 409).

The signal processing unit 31B then judges whether the calculated height is larger than a predetermined threshold value $h_0$ (Step 410). The threshold value to be compared is set to a value larger by a proper value than the height of the vehicle 200, i.e., to a lowest height allowing the vehicle 200 to pass through it safely. Therefore, this process judges whether the vehicle 200 can pass through the stationary target safely.

If it is judged that the height of the stationary target is larger than the threshold value $h_0$, i.e., if it is judged that the vehicle 200 can pass through the stationary target safely, the signal processing unit 31B supplies the motor control circuit 32 with a control command including the rotation angle "−90 degrees" of the motor 50. In response to this, the motor control circuit 32 rotates the shaft of the motor 50 by −90 degrees to rotate the frame by −90 degrees about the reference axis. As shown in FIG. 5, the three antenna elements 13, 21a and 21b recover the initial condition that the elements are disposed in line generally along the horizontal direction the process at Step 401.

Figure 13:
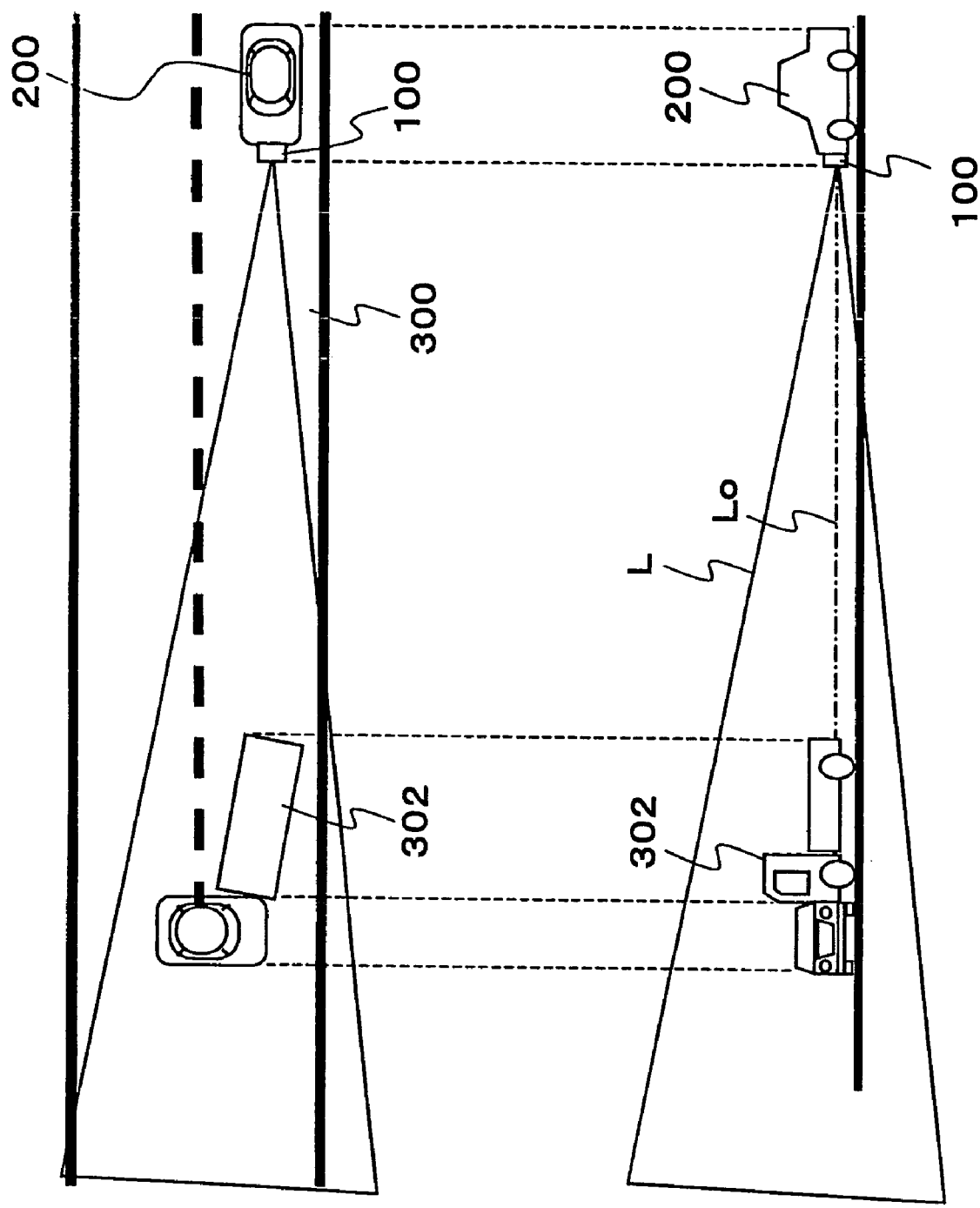
FIG. 13 is a diagram showing the positional relation between the radar and a stationary target in the local search range according to the embodiment of the present invention.

Conversely, if the height of the stationary target is lower than the threshold value $h_0$, i.e., if the vehicle 200 cannot pass through the stationary target, the signal processing unit 31B supplies the alarm apparatus with an alarm command instructing to output an alarm message, and supplies the ACC system with an alarm command instructing deceleration (Step 412). Therefore, the alarm apparatus outputs the alarm message to the effect that an obstacle exists ahead, whereas the ACC system controls the drive system of the vehicle 200 in order to apply a braking power to the vehicle 200. For example, as shown in FIG. 13, if an accident vehicle 302 having a height of almost zero relative to the reference axis $L_0$ stops on the traffic lane of the vehicle 200, the alarm apparatus outputs the alarm message to the effect that an obstacle exists ahead and the vehicle 200 is automatically decelerated. Although the alarm apparatus outputs the alarm message to the effect that an obstacle exists ahead, flushing an LED, outputting an alarm sound or the like may be used as an alarm reporting an occurrence of a predetermined trouble.

If a stationary target is not detected thereafter on the traffic lane of the vehicle 200, by bypassing the obstacle or the like, the signal processing unit 31B supplies the motor control circuit 32 with the control command including the rotation angle "−90 degrees" of the motor 50, similar to the case of judging that the vehicle 200 can pass through the stationary target safely, to thereby dispose the three antenna elements 13, 21a and 21b in line generally along the horizontal direction (Step 411). Thereafter, the microcomputer 31 returns to the process at Step 401.

With these processes, when a stationary target is detected on the traffic lane of the vehicle 200, the height of the stationary target can be detected by rotating the angle cover area of the radar, so that it is possible to confirm whether the vehicle can pass through the stationary target on the traffic lane of the vehicle 200 safely. Since this confirmation result can be used for the judgment of necessity of an alarm message and for the control of a drive system of the vehicle, it is possible to prevent the vehicle 200 from being decelerated or an unnecessary alarm message from being output, in the case wherein a high level road or the like having no possibility of contact exists.

Although the above description has been made on the assumption that the radar 100 is mounted on the vehicle 200, the radar 100 according to the embodiment of the present invention may obviously be mounted not only on the vehicle 200 but also on other moving bodies. Also in this embodiment, although the alarm apparatus and ACC system are connected to the radar 100, this arrangement is not necessarily required. For example, only one of the alarm apparatus and ACC system may be connected as an external apparatus to the radar 100, or another apparatus using an output (target information) of the radar 100 may be connected as an external apparatus to the radar 100. If the alarm apparatus is mounted in the frame and connected to the microcomputer, the alarm apparatus is not necessary to be connected as an external apparatus to the radar 100.

Although the invention is applied to a two-frequency CW radar of the monopulse type by way of example, the radar to which the present invention is applicable is not limited to the two-frequency CW radar of the monopulse type. For example, the present invention is applicable to radars of an azimuth detection type (mechanical scan type, a beam switching type and the like) different from the monopulse type, and radars of a modulation type (pulse radars, FM-CW radars and the like) different from the two-frequency CW type. Namely, even radars of any type can detect the target azimuth angle in an arbitrary plane including the reference axis by mounting a motor for rotating the azimuth angle in the cover area about the reference axis.

INDUSTRIAL APPLICABILITY

As described above, according to the present invention, a radar is provided which can detect an azimuth angle of a target in an arbitrary plane including a reference azimuth.

The invention claimed is:

1. A vehicle-mounted radar apparatus comprising:
   a radio wave transmitting antenna for transmitting a radio wave toward a target to be detected in a traveling direction of a vehicle on which the radar apparatus is mounted;
   a radio wave receiving antenna for receiving a radio wave reflected by the target;
   a control unit for calculating a target azimuth angle within a plane in which the radio wave transmitted from the radio wave transmitting antenna propagates, in accordance with radio wave received by the radio wave receiving antenna;
   an antenna array unit for accommodating both the radio wave transmitting antenna and the radio wave receiving antenna; and
   a motor unit for rotating the antenna array unit about a rotation axis parallel to a transmitting direction of radio wave.

2. The vehicle-mounted radar apparatus according to claim 1, wherein:
   the receiving antenna includes a pair of radio wave receiving elements; and
   the control unit calculates the azimuth angle based on phase difference of radio waves received by each of the pair or radio wave receiving elements.

3. The vehicle-mounted radar apparatus according to claim 1, wherein a rotation axis of the motor is coaxial with a rotation axis of the antenna array unit.

4. The vehicle-mounted radar apparatus according to claim 1, wherein rotating force of the motor is transferred to the rotation axis of the antenna array unit through a belt member.

5. The vehicle-mounted radar apparatus according to claim 1, wherein a rotation angle of the antenna array unit is 90-degrees.

6. The vehicle-mounted radar apparatus according to claim 5, wherein the control unit controls the antenna array unit so as to rotate 90-degrees when a stationary target is detected.

7. The vehicle-mounted radar apparatus according to claim 1, wherein the control unit further calculates a target azimuth angle within a vertical plane.

8. The vehicle-mounted radar apparatus according to claim 7, wherein the control unit further judges whether the stationary target interferes with a path of the vehicle in accordance with the target azimuth angle.

9. The vehicle-mounted radar apparatus according to claim 8, wherein the control unit further outputs a brake signal for deceleration of the vehicle if the control unit has determined that the stationary target interferes with the path of the vehicle.

10. A vehicle-mounted radar apparatus comprising:
    a radio wave transmitting antenna for transmitting radio wave toward a target to be detected in a traveling direction of the vehicle on which the radar apparatus is mounted;
    a radio wave receiving antenna for receiving a radio wave reflected by the target;
    a control unit for calculating a target azimuth angle within a plane in which the radio wave transmitted from the radio wave transmitting antenna propagates, in accordance with radio wave received by the radio wave receiving antenna;
    a frame unit for accommodating both the radio wave transmitting antenna and the radio wave receiving antenna; and
    a motor unit for rotating the frame unit about a rotation axis parallel to a transmitting direction of radio wave.

11. The vehicle-mounted radar apparatus according to claim 10, wherein:
    the receiving antenna includes a pair of radio wave receiving elements; and
    wherein the control unit calculates the azimuth angle based on phase difference of radio waves received by each of the pair of radio wave receiving elements.

12. The vehicle-mounted radar apparatus according to claim 10, wherein a rotation axis of the motor is coaxial with a rotation axis of the frame unit.

13. The vehicle-mounted radar apparatus according to claim 10, wherein rotating force of the motor is transferred to the rotation axis of the frame unit through a belt member.

14. The vehicle-mounted radar apparatus according to claim 10, wherein a rotation angle of the frame unit is 90-degrees.

15. The vehicle-mounted radar apparatus according to claim 14, wherein the control unit controls the frame unit so as to rotate 90-degrees when a stationary target is detected.

16. The vehicle-mounted radar apparatus according to claim 15, wherein the control unit further calculates a target azimuth angle within a vertical plane.

17. The vehicle-mounted radar apparatus according to claim 16, wherein the control unit further judges whether the stationary target interferes with a path of the vehicle in accordance with the target azimuth angle.

18. The vehicle-mounted radar apparatus according to claim 17, wherein the control unit further outputs a brake signal for deceleration of the vehicle if the control unit has determined that the stationary target interferes with the path of the vehicle.

* * * * *